(12) United States Patent
Canizales et al.

(10) Patent No.: US 7,138,027 B1
(45) Date of Patent: Nov. 21, 2006

(54) SKATEBOARD AND METHOD OF MANUFACTURING

(76) Inventors: Zach Canizales, 3304 Par Dr., Oceanside, CA (US) 92056; Fred Buchanan, 29381 Thornhill Dr., Sun City, CA (US) 92586

( * ) Notice: Subject to any disclaimer, the term of this patent is extended or adjusted under 35 U.S.C. 154(b) by 185 days.

(21) Appl. No.: 10/725,262

(22) Filed: Dec. 1, 2003

(51) Int. Cl.
*B29C 43/02* (2006.01)

(52) U.S. Cl. ................ 156/245; 156/242; 156/285; 156/286; 264/258; 264/319; 264/553; 264/571

(58) Field of Classification Search ............... None
See application file for complete search history.

(56) References Cited

U.S. PATENT DOCUMENTS

| | | | |
|---|---|---|---|
| 4,295,656 A * | 10/1981 | Moore | 280/87.042 |
| 4,337,963 A | 7/1982 | Stevenson | |
| 4,921,513 A | 5/1990 | Parten | |
| 5,028,100 A * | 7/1991 | Valleau et al. | 324/232 |
| 5,649,717 A | 7/1997 | Augustine et al. | |
| 5,716,562 A | 2/1998 | Peart et al. | |
| 6,021,843 A | 2/2000 | Roach | |
| 6,059,307 A | 5/2000 | Western | |
| 6,182,986 B1 | 2/2001 | Smith | |
| 6,203,037 B1 | 3/2001 | Wilson et al. | |
| 6,214,142 B1 | 4/2001 | Saputo | |
| 6,273,440 B1 | 8/2001 | Wilson | |
| 6,293,571 B1 | 9/2001 | Wen | |
| 6,386,561 B1 | 5/2002 | Hanson | |
| 6,419,248 B1 | 7/2002 | Kay | |
| 6,435,558 B1 | 8/2002 | Osawa | |
| 6,460,868 B1 | 10/2002 | Madrid | |
| 6,520,518 B1 | 2/2003 | Lo | |
| 6,527,284 B1 | 3/2003 | Bert | |
| 2002/0064640 A1 * | 5/2002 | Renard et al. | 428/297.4 |

* cited by examiner

*Primary Examiner*—Jessica Rossi
(74) *Attorney, Agent, or Firm*—Benjamin Applebaum (57) ABSTRACT

A laminated deck for a skateboard comprises a plurality of layers of graphite cloth alternating with a plurality of layers of a laminating resin. The deck is formed after treating the layers of material for between one-half hour to six hours under a vacuum at a temperature ranging from ambient temperature to 600 degrees F., depending upon the manufacturing process, whether using a hand layup process, or multiple layers of graphite cloth containing a laminating resin ("pre-preg") material). An additional lower layer of fiberglass, which can become the deck bottom, may be used in both processes. The laminated skateboard deck has properties that are at least comparable to those of wooden skateboard decks.

9 Claims, 6 Drawing Sheets

SKATEBOARD AND METHOD OF MANUFACTURING

FIELD OF THE INVENTION

The present invention relates to skateboards. In particular, the present invention relates to a skateboard whose deck is manufactured by laminating layers of carbon fiber together, over a single layer of fiberglass, under heat and pressure, with the resulting skateboard deck produced in this manner having properties comparable to those of skateboard decks manufactured from wood.

BACKGROUND OF THE INVENTION

An embodiment of the present invention is a skateboard deck manufactured by laminating layers of carbon fiber together under heat and vacuum, over a single layer of fiberglass, and the skateboard deck produced in this manner has properties at least comparable to those of skateboard decks manufactured from woods. The earliest skateboards had decks that were made of wood, but plastics, fiberglass, KEVLAR® (Registered trademark of E.I. DuPont de Nemours Co., Wilmington, Del.), and metals have also been used to form the deck. These materials have different characteristics and properties, which affect the performance of the skateboard. For example, a longboard (which we will define here as a skateboard having a distance of at least 26 inches between the front and rear skateboard wheels) is generally preferred by skateboarders when engaging in downhill skateboarding activities, while a small board, or "Standard" size skateboard, generally having an overall length of between approximately 30 inches to approximately 33 inches, is more commonly preferred when skateboarding on ramps.

A review of prior art discloses a number of patents which describe skateboards and aspects of their manufacture.

Western (U.S. Pat. No. 6,059,307) discloses a method of manufacturing a skateboard deck using a core of wood plies surrounded by a cover comprising a pregnable cloth, such as fiberglass cloth or carbon fiber cloth. One embodiment uses a sheet of pregnable cloth placed over the upper surface and lower surface of the deck. A second sheet of pregnable cloth is placed over the first sheet, with the threads running at a 45 degree angle to each other.

Peart et al. (U.S. Pat. No. 5,716,562) discloses a method for making an injection molded, foamed, composite material skateboard. The skateboard body is formed of a composite material including a foamed structural plastic mass including plural, elongate strands of carbon fiber material distributed within the confines of the mass; the carbon fiber strands contribute within the range of about 5% to about 70& of the total weight of the mass. The skateboard body is formed by injection molding using a thermoplastic such as nylon, polypropylene and polyethylene.

Bert (U.S. Pat. No. 6,527,284 B2) discloses a skateboard deck comprising a plurality of layers of wood plies; the deck plies preferably being made from a wood such as maple. The deck further includes reinforcement members, positioned either at the front of the deck, in the area where the front wheels are fixed, in the rear where the rear wheels are fixed, or on the periphery of the deck, with the reinforcement being inserted between the upper surface layer and the lower surface layer.

In U.S. Pat. No. 6,520,518 B2 Lo discloses an aluminum skateboard including an upper plate and a lower plate, with reinforcing ribs being integrally formed on the inner wall of each plate.

Madrid (U.S. Pat. No. 6,460,868 B2) discloses a corrugated wooden skateboard deck and the use of a high density polyethylene mold in which to form the corrugations within the deck. The deck is formed from a plurality of wooden plies, interspersed with a bonding agent, and formed within the mold under conditions of pressure until the bonding agent sets.

In U.S. Pat. No. 6,435,558 B2 Osawa discloses a roller ski board formed from a light material, such as a synthetic resin, glass fiber and light metal or light compound material such as a plywood, etc.

Kay (U.S. Pat. No. 6,419,248 B1) discloses a skateboard having a deck comprising an upper and a lower platform separated by a plurality of journaled bearings, allowing for control of the skateboard.

In U.S. Pat. No. 6,293,571 B1 Wen discloses a skateboard comprising an elongated body with a hollow core and a plurality of reinforcing ribs within the deck. The elongated body, reinforcing ribs and the strengthened frame are integrally made of a moldable material, such as aluminum alloy.

Wilson (U.S. Pat. No. 6,273,440 B1, "the '440 patent" and U.S. Pat. No. 6,203,037) discloses a metal sports board, manufactured from aluminum. In the '440 patent, the metal board also includes one or more longitudinally elongated cavity-forming sections which may be filled with an appropriate light weight filler material such as a foamed plastic, a wood or wood composite material, or an inflatable bladder to aid in the strength and/or manufacturing of the metal sports board.

In U.S. Pat. No. 6,214,142 B1 Saputo discloses a method of making a skateboard deck using multiple layers of wood veneers. The method uses several layers of wood veneers in a hydraulic press, followed by shaping them on a CNC (computer numerical control) device, adding truck mounting inserts and an additional veneer layer.

In U.S. Pat. No. 5,649,717 Augustine et al. disclose a snowboard comprising a base of high density polyethylene, over which a layer of cloth, particularly hemp, is applied, and to which layers of fiberglass and a veneer panel are applied. A core made of wood, metal, KEVLAR® (Registered trademark of E.I. DuPont de Nemours Co., Wilmington, Del.) or other resilient material with metal plates or inserts is encapsulated with a layer of fiberglass. The core is placed over the veneer layer, and a final layer of cloth material is used to surround the base and core.

Parten (U.S. Pat. No. 4,921,513) discloses a method for making a wooden skateboard, in which a printed label is applied to the board lower surface by an adhesive, so that the outer periphery of the label matches the contours of the board's lower surface.

In U.S. Pat. No. 4,337,963 Stevenson discloses a skateboard wherein the skateboard pieces can be formed from plastics such as polypropylene, polyethylene, polycarbonate, or other suitable plastic which can be injection molded.

Moore (U.S. Pat. No. 4,295,656) discloses a skateboard having flexible sides, the board comprising a spine of laminated hardwoods encased between layers of fiberglass.

Smith (U.S. Pat. No. 6,182,989 B1) discloses a skateboard having laminations which are selected from at least two or more materials, one material being wood and the other material being non-wood. The non-wood material can be a layer of carbon fiber or fiberglass.

Hanson (U.S. Pat. No. 6,386,561 B1) discloses a laminated skateboard comprising a wood core with fiberglass layers.

Thus, while others described skateboard decks made from wood, wood laminates, or wood with a carbon fibre layer, no skateboard decks are described in which the entire deck is manufactured from carbon fiber, or with multiple layers of carbon fiber plus a single layer of fiberglass as a base. An embodiment of the present invention is a skateboard whose deck is manufactured from multiple layers of carbon fiber, and which has strength that is comparable to wooden skateboard decks. Embodiments of skateboard decks of the present invention are very durable, unlike wooden skateboard decks which frequently break during use. The performance of embodiments of skateboard decks of the present invention differs from that of wooden skateboard decks, such that embodiments of skateboards made using the present invention flex more than wooden skateboards, they do not slide when one is taking corners, because it is theorized that they create a greater downward force when cornering thereby minimizing the sideward forces that would cause sliding on corners, than do wooden skateboard decks. Embodiments of the skateboard decks of the present invention can be manufactured using either a manual layup process or a thermoforming process, both of which are also described herein.

BRIEF SUMMARY OF THE INVENTION

An object of the present invention is to provide a skateboard deck manufactured from carbon fiber.

Another object of the present invention is to provide a skateboard deck manufactured from carbon fiber and with a layer of fiberglass.

Another object of the present invention is to provide a method of manufacturing a skateboard deck from a durable material such as carbon fiber.

Another object of the present invention is to produce a skateboard deck that is durable in use.

Embodiments of the present invention are a laminated skateboard deck, formed using either a hand layup process or a thermoforming process. Embodiments of the skateboard deck comprises a plurality of layers of graphite cloth alternating with a plurality of layers of a laminating resin. The deck is formed after treating the layers of material for approximately 45 minutes under a vacuum at a temperature ranging from ambient temperature to approximately 85 degrees F. Using the thermoforming process, multiple layers of graphite cloth containing a laminating resin ("pre-preg" material) are inserted into a mold, and subjected to a temperature ranging from approximately 200 to approximately 600 degrees F. for a time period ranging from approximately 1 hour to approximately 6 hours under a vacuum. An additional lower layer of fiberglass, which can become the deck bottom, may be used in both processes. The laminated skateboard deck has properties that are at least comparable to those of wooden skateboard decks.

DETAILED DESCRIPTION OF THE INVENTION

Figure 1:
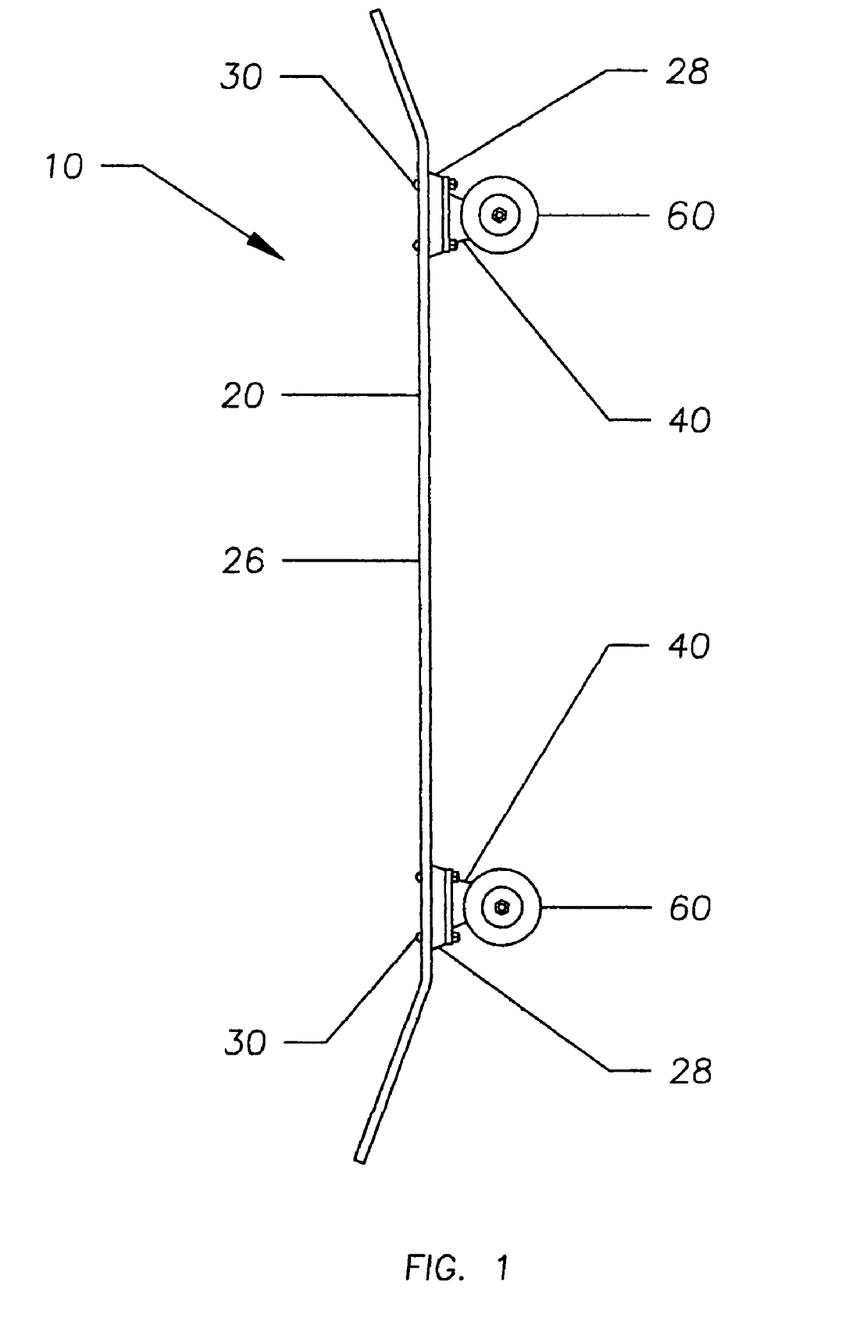
FIG. 1 is a perspective view of a skateboard embodiment of the present invention.

An embodiment of the present invention is a skateboard 10 which comprises a skateboard deck 20, a plurality of trucks 40, and a plurality of wheels 60 connected to the trucks (FIG. 1). The deck 20 is attached to the trucks 40 by means of fasteners 30. The fasteners 30 can be bolts and nuts, screws, rivets, or other suitable fasteners known to those skilled in the art. Adhesives could also be used. Generally, the fastener used is a nut and bolt, to form a secure connection with the deck.

For purposes of the present specification, the terms "carbon fiber" and "graphite cloth" will be used interchangeably to refer to the same material.

Figure 3:
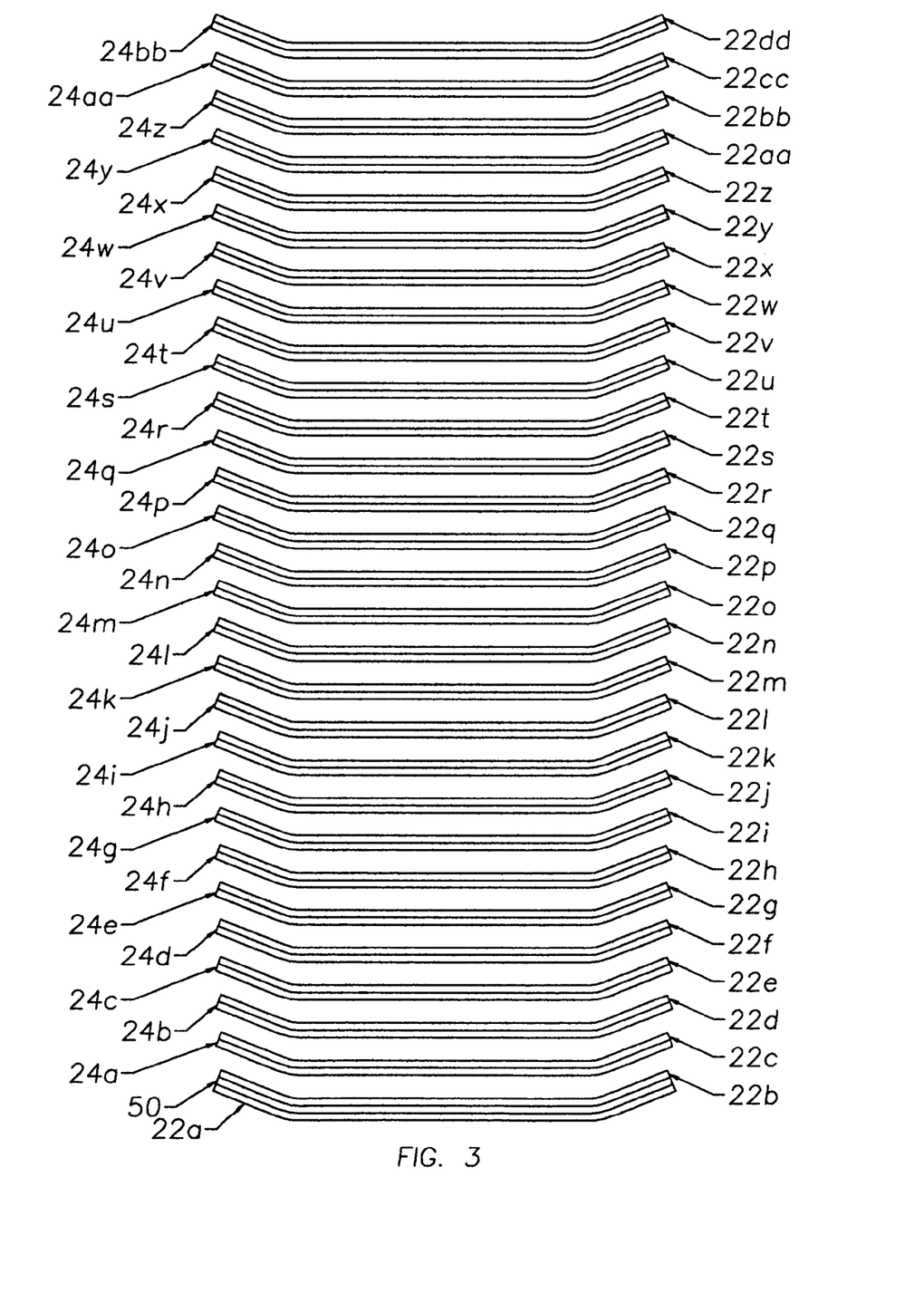
FIG. 3 illustrates the formation of a laminated skateboard deck.

The deck 20 is made from a plurality of layers of graphite cloth 24a–24xx where xx is the number of layers of graphite cloth used. Interspersed between the layers of graphite cloth 24a–24xx is a plurality of layers of a laminating resin 22a–24xx, where xx is the number of layers of laminating resin. Generally, xx is identical for both the number of layers of graphite cloth 24 and the number of layers of the laminating resin 22 (FIG. 3).

Deck 20 further comprises a main deck region 26 and deck 20 is separated from trucks 40 by standoffs 28.

Figure 2A:
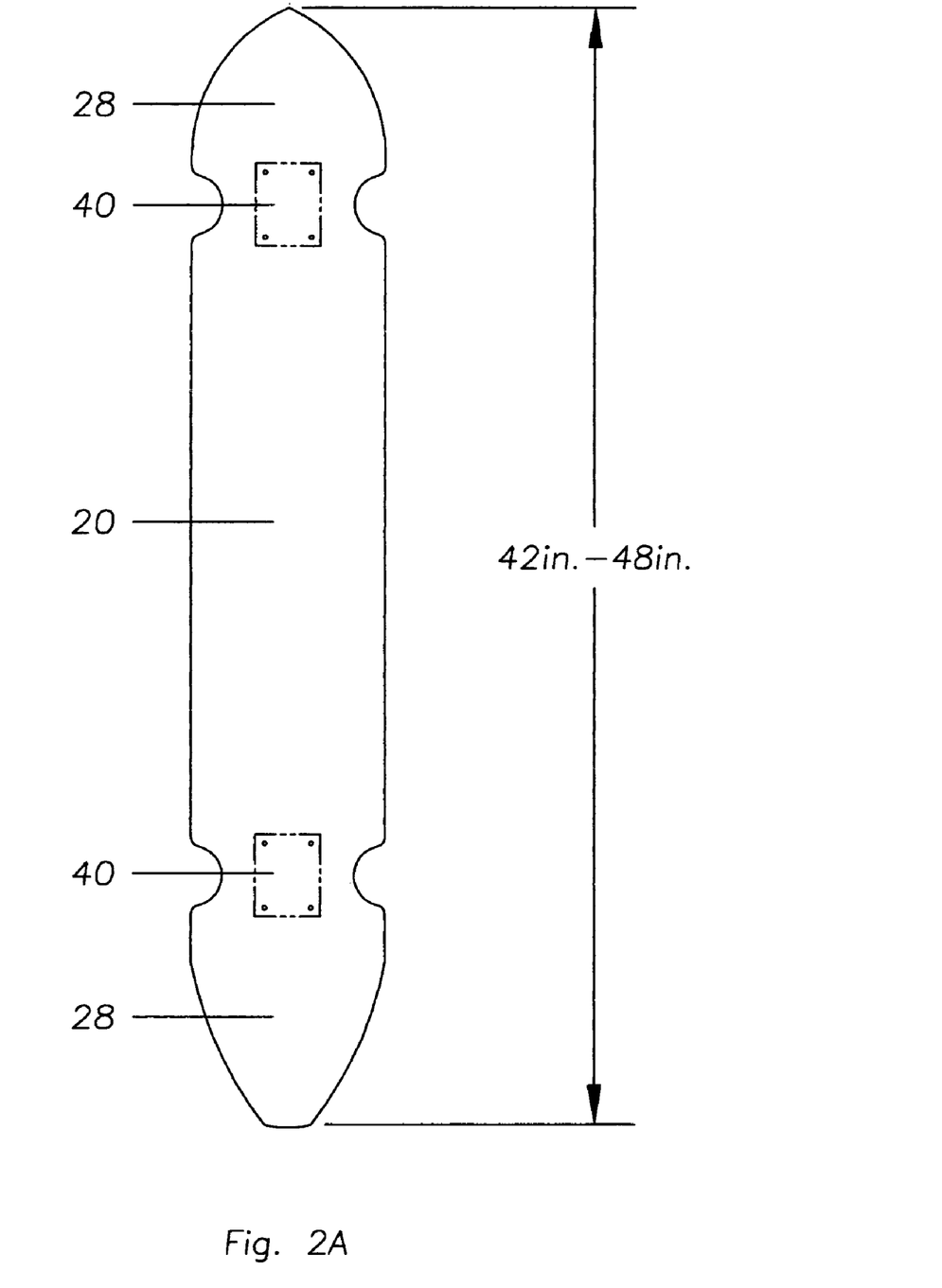
Figure 2B:
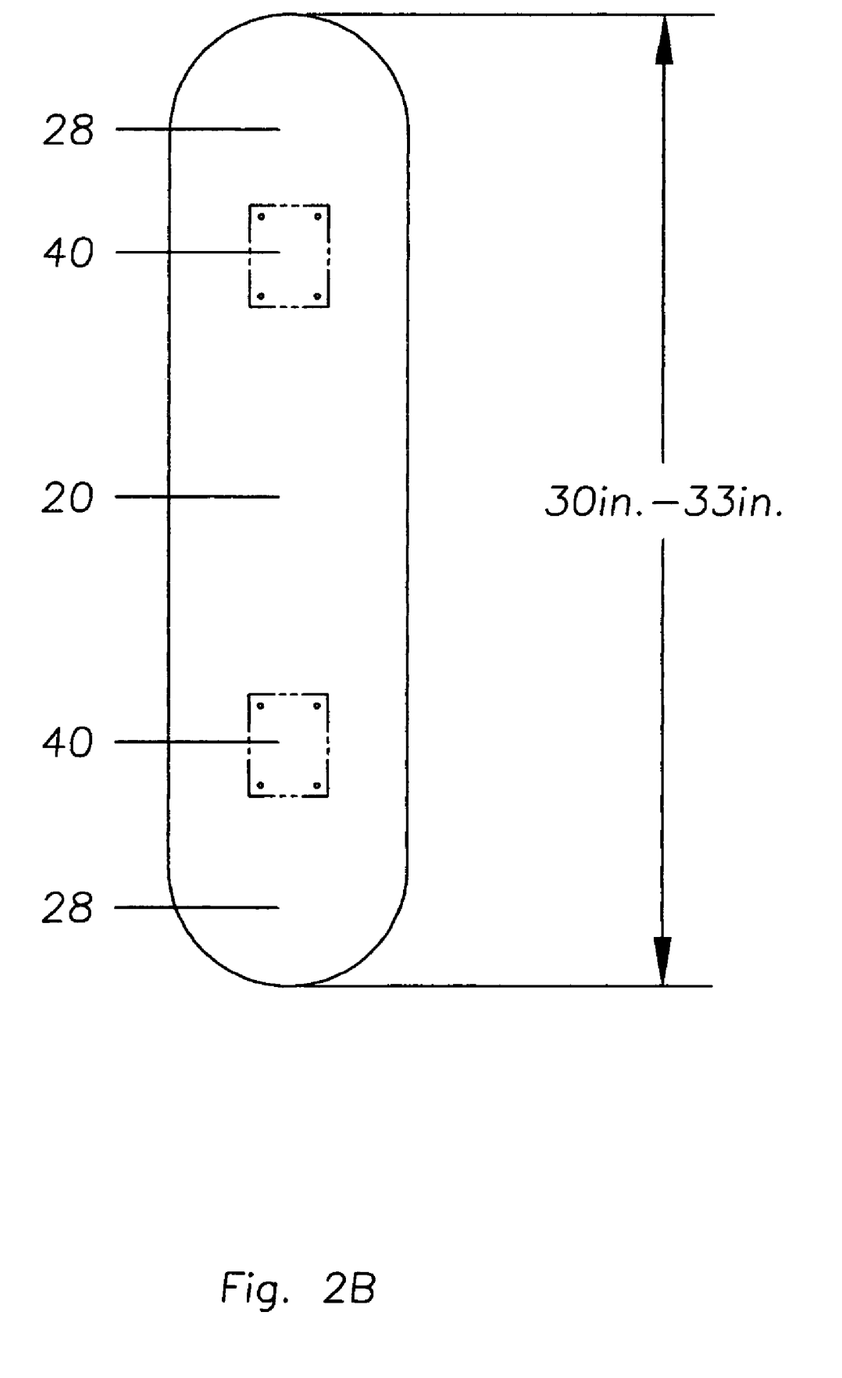
Figure 2C:
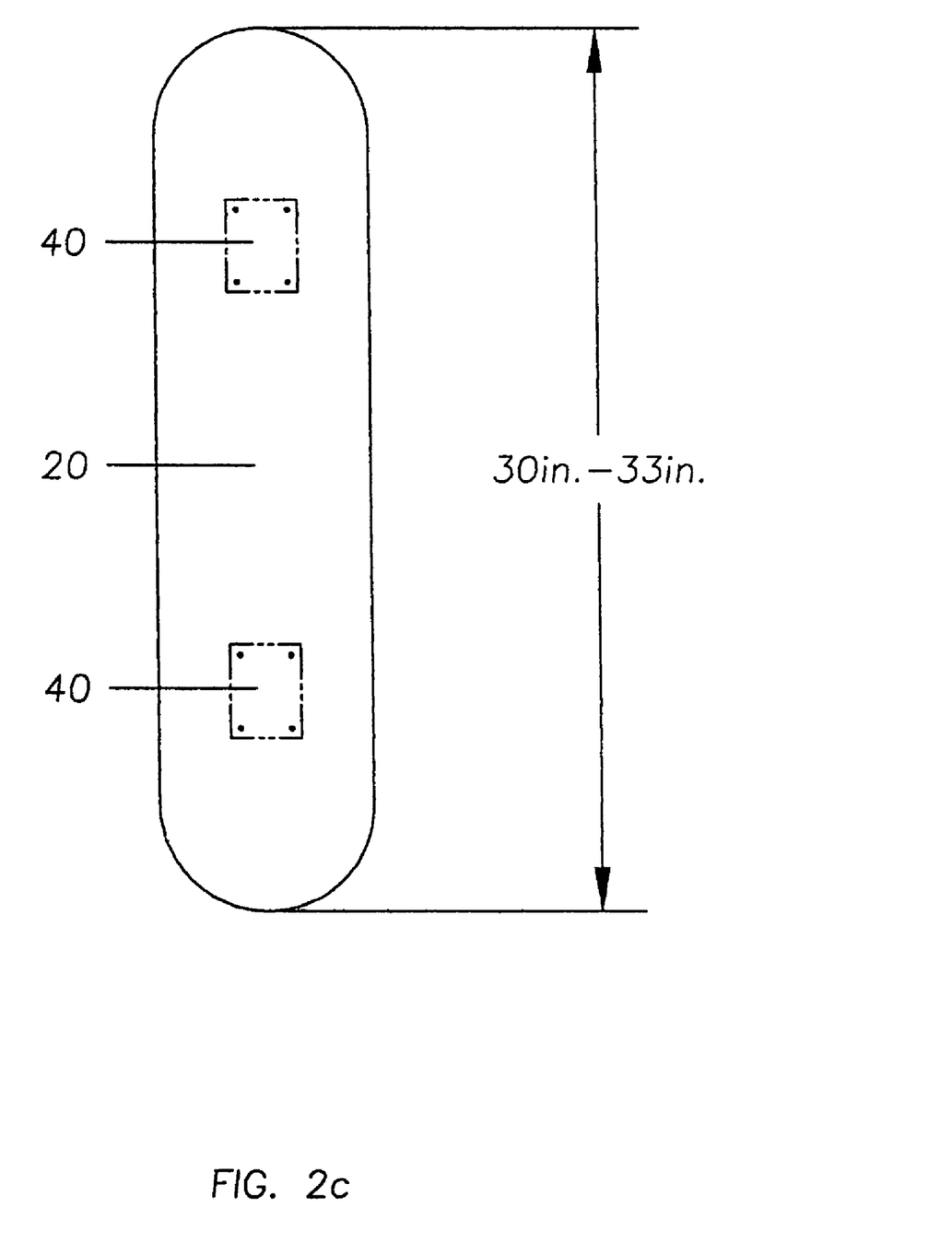
FIG. 2 is a top plan view of two embodiments of the present invention, FIG. 2A illustrating the longboard embodiment, and FIG. 2B illustrating the smallboard embodiment.

FIG. 2 illustrates two embodiments of a skateboard deck produced using the methods described below. FIGS. 2A and 2B represent embodiments referred to herein as a "longboard", and "small board", respectively. As seen in a top plan view, the boards differ in their overall configuration, with the length of the longboard being between approximately 42 inches to approximately 48 inches with a width ranging from approximately 7 inches to approximately 10 inches. The general dimensions of the small board are approximately 30 inches to approximately 33 inches length with a width ranging from approximately 7 to approximately 8 inches. A mid-board, that is, one having a length that is intermediate between the short and the long board, generally has a width ranging from approximately 7 to approximately 8.5 inches (not shown). However, the widths of any particular skateboard may vary from those described, depending upon the final shape of the skateboard, and the dimensions described herein are for purposes of example only, and not intended as a limitation. The dimensions of the trucks of the two boards (shown in the figures in phantom) are slightly different, but will not be described further.

The decks of the two skateboards differ, inasmuch as that of the longboard is thicker, with its main deck comprising 26 layers each of the graphite cloth and laminating resin, and the small board main deck comprises 21 layers each of graphite cloth and laminating resin. The standoffs 28 of both boards comprise 12 layers of each material, i.e., 12 layers of graphite cloth and 12 layers of laminating resin.

A layer of fiberglass 50 may also be used in the manufacture of these skateboard deck embodiments 20. Referring to FIG. 3, this additional layer is formed by sandwiching the fiberglass 50 between two layers of laminating resin 22a and 22b, and using the fiberglass layer as the base layer onto which the remainder of the skateboard deck is built. In so doing, the fiberglass layer becomes the bottom surface of the finished deck. The fiberglass layer provides a more finished appearance to the skateboard deck.

Embodiments of the present invention are made using what is referred to as a hand layup process.

Hand Layup Process for Skateboard Decks.

In this process, a bulk piece of graphite cloth, having a thickness ranging of approximately 0.010 inches, with a tolerance of ±0.005 inches, is cut into a plurality of pieces of a specified size, which is slightly greater than the intended final dimension of the finished product. Then a layer of a laminating resin is applied to a first layer of the graphite cloth, and the excess resin is removed with a squeegee or similar device, to provide a layer of laminating resin having a thickness approximately equal to the thickness of the underlying graphite cloth.

A second layer of graphite cloth is applied to the combination of graphite cloth-laminating resin, and the process of adding laminating resin, removing excess laminating resin, and adding graphite cloth is repeated until a sandwich which will become the skateboard deck of a specified thickness has been achieved.

Generally, this can be done either by manual or machine application of a squeegee or similar device, or by the application of a vacuum to the graphite fiber-laminating resin sandwich, to extract all excess air from the laminate.

After the sandwich has been formed and the excess resin is removed, this cloth-resin sandwich is subjected to a vacuum of approximately 90 psi (pounds per square inch) to approximately 125 psi at a temperature ranging from approximately 75 degrees F. to approximately 85 degrees F. (ambient temperature), for generally approximately 45 minutes.

After the skateboard deck has been formed, excess graphite cloth and resin are removed to trim the skateboard deck to a desired shape, the skateboard deck sanded, and one or more coats of a finish, such as paint, varnish or the like is applied to provide a finished appearance. The trucks and wheels, and any other accessories needed for the skateboard, are then applied.

Figure 4:
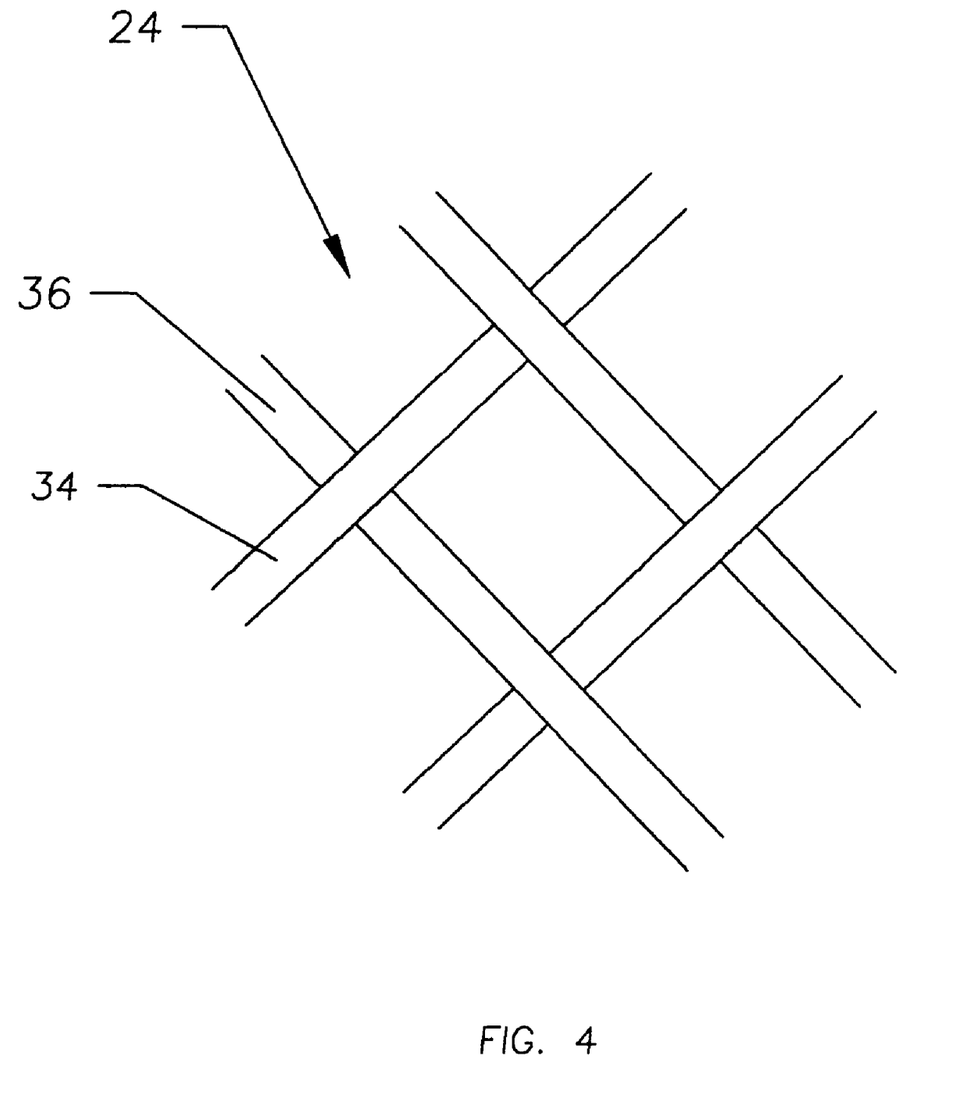
FIG. 4 illustrates the fiber pattern of a sheet of graphite cloth.

The fiber directions are alternated with respect to each other for each layer of the laminate; the most common and easily accessible graphite cloth available is produced having the 90 degree criss-cross formation, wherein the fibers 34 and 36 have an under-over weave configuration (FIG. 4, shown grossly exaggerated) Generally the thickness of a single ply of this cloth is 0.010".

The plies of the graphite cloth used in the laminate come oriented in a particular direction. However, as the layers of graphite cloth are built to form the laminated deck, the orientations of each successive layer can be changed relative to the prior layers. This common stacking sequence can be noted as 0, 90, +45, −45, 90, 0 for a 3 layer laminate, where one laminate layer is defined as comprising 2 layers of fabric and one layer of resin therebetween. In an embodiment of the present invention, by using graphite cloth laminate that is interwoven, and yielding fibers perpendicular to each other, using the most common stacking sequence described above, this works out to be a three layer laminate as defined above.

Embodiments of skateboard decks made using the process of the present invention range in thickness from 14–26 layers, depending upon the size and weight of the rider, as well as the type of terrain, such as, but intended to be limited to, whether asphalt, ceramic, concrete, desert, dirt, linoleum, tiles of all materials, wood, or other surfaces, on which the skateboard will most often be used. Consequently, skateboards made using the process of the present invention are able to be used in a wide range of terrains, and depending upon customer requirements, the process of the present invention can be used make a custom skateboard for any ramp (indoor or outdoor) and a different skateboard for use in, for example only, and not intended as any limitation, a downhill or slalom type of skateboard use.

A layer of fiberglass 50 may also be used in the manufacture of these skateboard deck embodiments. Referring to FIG. 3, this additional layer is formed by sandwiching the fiberglass 50 between two layers of laminating resin 22a and 22b, and using the fiberglass layer as the base layer onto which the remainder of the skateboard deck is built. In so doing, the fiberglass layer becomes the bottom surface of the finished deck. The fiberglass layer provides a more finished appearance to the skateboard deck Thermoforming Process for Graphite Skateboard Decks.

In addition to the hand layup process, embodiments of the skateboard deck of the present invention may also be manufactured using a thermoforming process. The thermoforming process can employ a carbon fiber cloth known in the industry as a "pre-preg" cloth. For purposes of this specification, "pre-preg" refers to carbon fiber cloth which is supplied containing the resin already in it; once the cloth is heated, the resin becomes activated and binds the layers of cloth together. One example of a pre-preg cloth is available from Revchem Plastics, Redlands, Calif., and sold as graphite or carbon fiber cloth.

A set of dies is manufactured, for use in a press type operation. These dies are generally machined from metal, and will not only form the skateboard decks but at the same time they will allow for the outside edges of the deck to be trimmed once the dies are brought together. The material used for the decks is multiple layers of 0.015" thick sheets of pre-preg graphite cloth. The term graphite can be interchanged with the term carbon fibre, as has been described previously.

The process of thermoforming involves applying a vacuum in conjunction with the application of heat to the materials. Applied pressure during the operation is left minimal in respect to the vacuum and applied heat. The vacuum is used to pull air out of the mold and from in between the multiple layers of pre-preg cloth and resin. Typically a vacuum ranging from approximately 20 psi to approximately 50 psi is applied and maintained during the curing process of each unit. The temperature range varies, ranging from between approximately 200 degrees F. to approximately 600 degrees F. More commonly, a temperature range of between approximately 250 degrees F. to approximately 300 degrees F. is used, with approximately 250 degrees F. being the most commonly employed temperature, thereby causing the resin contained within the pre-preg cloth to exotherm, i.e., that the resin has started to flow and react. The vacuum and temperature parameters must be adjusted for atmospheric deviations that may occur throughout the curing time. The curing time for the laminated skateboard decks could be between approximately 1 hour to approximately 4 hours, depending upon temperature, but generally the curing time is approximately two and one half hours.

The fiber orientation in the pre-preg cloth most commonly sold is of a 0, 90 configuration. In this configuration, such as shown in FIG. 4, the fibers 34 and 36 run in the 0 direction and also in the 90 direction, interweaving throughout the cloth at approximately a 90 degree angle to each other. This common orientation will be used, so as to minimize waste of cloth. However, for custom applications, the fiber orientation may be altered to as to produce stronger possible configurations. When the fibers are oriented in for example only, a 0, 90, +45, −45, 90, 0 configuration, which in this instance represents a six-ply laminate, the strongest possible configuration is established for vertical loading. Skateboarding, however, uses more than just vertical loading and for this unique application different laminate configurations will need to be determined.

A layer of fiberglass 50 may also be used in the manufacture of these skateboard deck embodiments. Referring to FIG. 3, this additional layer is formed by sandwiching the fiberglass 50 between two layers of laminating resin 22a and 22b, and using the fiberglass layer as the base layer onto which the remainder of the skateboard deck is built. In so doing, the fiberglass layer becomes the bottom surface of the finished deck. The fiberglass layer provides a more finished appearance to the skateboard deck To determining the various strengths of the carbon fiber laminate skateboard deck we have used classical lamination theory in conjunction with the Tsai Hill failure criteria (Gibson, Ronald F., 1994, Principles of Composite Material Mechanics, pp. 101–106, McGraw-Hill Science, New York, N.Y.). The values shown below were determined using Tsai Hill lamination theory, but which equation is not shown because of its complexity. Shown below are equations based on using a singularity function.

Graphite Skateboard Flex Test

In order to calculate the deflection of the skateboard deck certain measurements must be made from the deck itself.

| L = Length between trucks | L = 21 in. |
| W = Width of deck | W = 7 in. |
| T = Thickness of deck | T = .22 in. |

For these calculations, one treats the skateboard as a simply supported beam with two vertical supports. The average weight of a person, assumed to be 200 pounds, riding the skateboard is assumed to be centered between the trucks, thereby simulating the maximum deflection undergone by the skateboard. In this case, the governing equation can be written as such:

$$\delta = \frac{F}{E \cdot I} - \left[\left[\frac{(L-a)}{L}\right]\right] \cdot [L^2 - (L - \text{position})^2] \cdot \text{position} - \left(\frac{L - \text{position}}{\text{position}}\right) \text{position}^3$$

| F = Average weight of rider | F = 200 pounds |
| E = Modulus of Elasticity of Graphite Laminate | E = 40 × 10$^6$ psi |
| I = Moment of Inertia of Deck Cross Section | $I = \frac{bT^3}{12}$ |
| Position of Rider Between Trucks | Position = L/2 |

By using a singularity function to describe the deflection of the skateboard deck between the trucks, the maximum deflection occurs at exactly half way between the trucks. The corresponding deflection for this point along the skateboard is:

δ=0.466 in.

To determine the maximum bending stress of the skateboard deck, the force will also be applied exactly halfway in between the trucks, and the governing equation is:

$$\sigma = \frac{My}{I}$$

First the bending moment must be determined:

M=F(Position)

M=2100 lbf·in

Next the centroid is calculated. In the example illustrated herein, assuming that the skateboard deck is relatively rectangular, the governing equation is merely:

y=T/2

After calculating the bending moment and the centroid, the maximum binding stress is computed by the equation:

$$\sigma = \frac{My}{I}$$

σ=37190 psi

If the yield stress of a graphite/epoxy laminate is known to be 65,000 psi, one can make the assumption that the calculated bending stress (37190 psi) is thus well within the yield limits for the given material.

The skateboard deck of the present invention, made from a laminate of carbon fiber layers, has a greater amount of flex than skateboard decks made from wood, and its' strength is comparable to that of wooden skateboard decks. The skateboard decks of the present invention are very durable, unlike wooden skateboard decks which frequently break during use. The performance of the skateboard decks of the present invention also differs from that of wooden skateboard decks, such that they do not slide when one is taking corners, as they create a greater downward force when cornering thereby minimizing the sideward forces that would cause sliding on corners.

Therefore, although this invention has been described with a certain degree of particularity, it is to be understood that the present disclosure has been made only by way of illustration, and that numerous changes in the details of construction and arrangement of parts may be resorted to without departing from the spirit and scope of the invention.

We claim:

1. A method for manufacturing a skateboard deck, the method comprising the steps of:
    forming a first layer of graphite cloth by taking a piece of graphite cloth, the graphite cloth comprising graphite cloth fiber and a laminating resin therein;
    applying a second layer of the graphite cloth to the first layer;
    determining a thickness of the deck by determining a number of layers the deck should have according to the weight of an end user, and conditions under which the deck will be used, using a singularity function;
    repeating the steps of forming and applying until the determined number of layers are used, forming the determined thickness;
    inserting the determined thickness of graphite layers into a mold; and
    subjecting the mold to a combination of heat and vacuum for a time sufficient for the laminating resin to cure and manufacture the skateboard deck, the deck having at least two regions where a truck will be attached thereto, the deck having a deflection, the deflection being at a maximum at a region of the deck that is halfway between the regions where the trucks will be attached, thereby creating a downward force when the skateboard is used for cornering that maintains control of the skateboard.

2. The method as described in claim 1, wherein the vacuum is between approximately 20–50 psi.

3. The method as described in claim 1, wherein the deck is cured for between approximately one and approximately 4 hours.

4. The method as described in claim 3, wherein the deck is cured for between approximately two and approximately 3 hours.

5. The method as described in claim 4, wherein the deck is cured for between approximately two and one-half hours.

6. The method as described in claim 1, wherein the heat is a temperature ranging from approximately 200 degrees F. to approximately 600 degrees F.

7. The method as described in claim 6, wherein the deck further comprises an additional layer, the additional layer comprising fiberglass and the laminating resin, the additional layer being the deck bottom.

8. The method as described in claim 6, wherein the heat is a temperature ranging from approximately 250 degrees F. to approximately 300 degrees F.

9. The method as described in claim 8, wherein the heat is a temperature of approximately 250 degrees F.

* * * * *